United States Patent Office 3,703,356
Patented Nov. 21, 1972

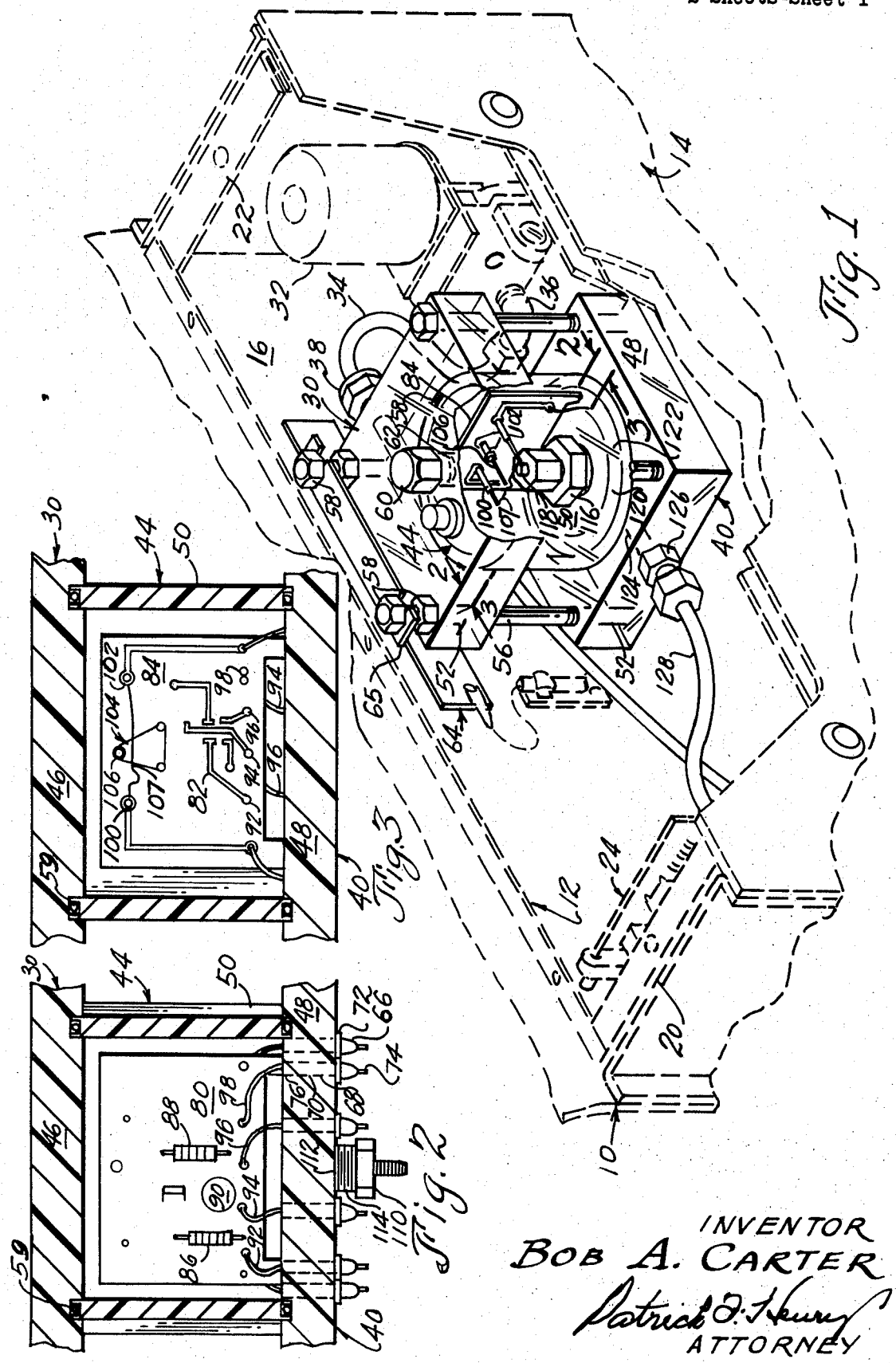

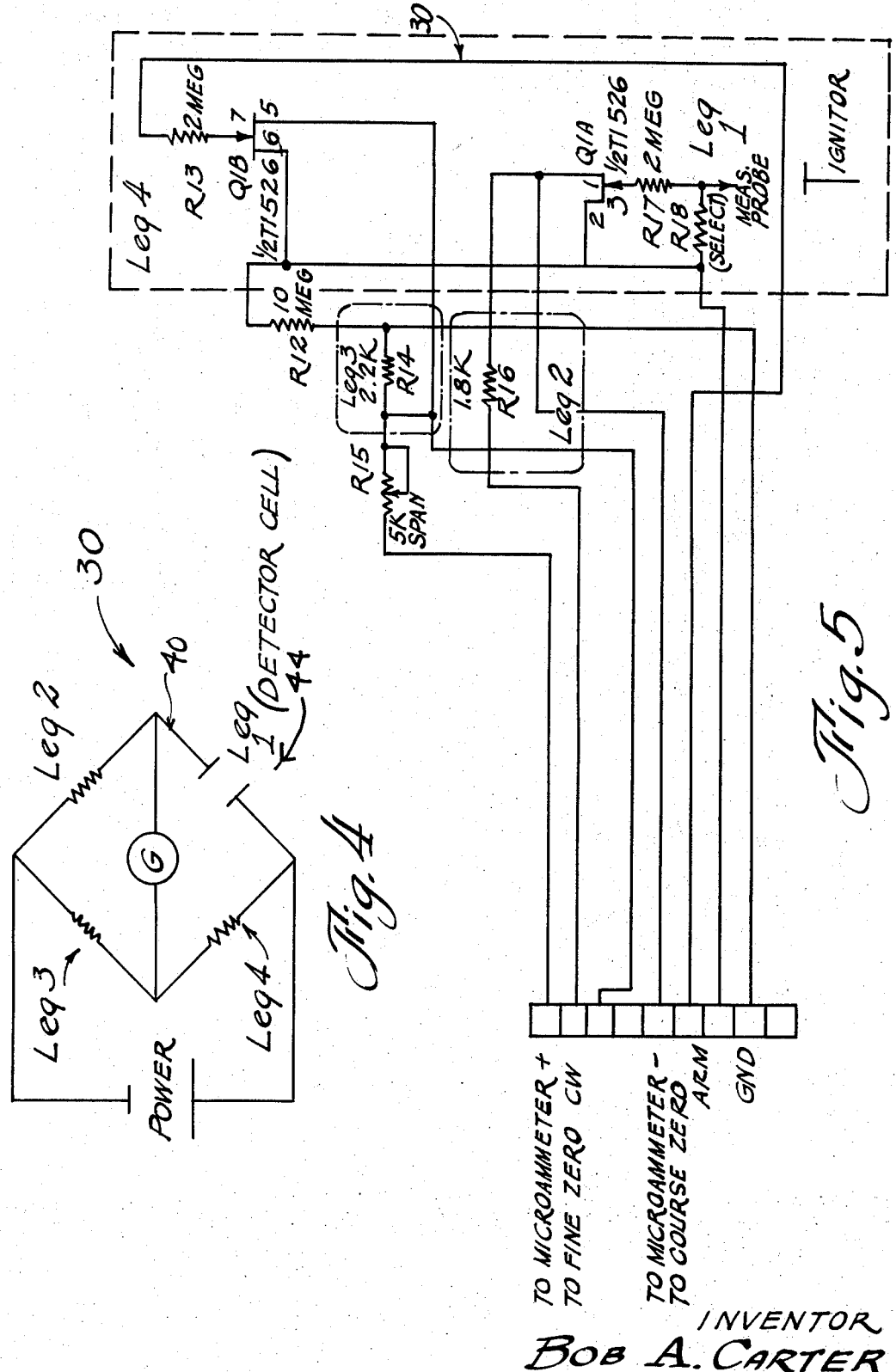

3,703,356
PORTABLE FLAME IONIZATION GAS LEAK DETECTOR
Bob A. Carter, Atlanta, Ga., assignor to Southern Cross Corp., Atlanta, Ga.
Filed Jan. 20, 1971, Ser. No. 107,970
Int. Cl. G01n 31/12
U.S. Cl. 23—254 EF        7 Claims

ABSTRACT OF THE DISCLOSURE

A detector unit for a portable flame ionization gas leak detector operating from relatively low voltage battery power and typically capable of field operation in excess of one day without recharging the fuel supply or the battery power supply. The basic electronic circuitry primarily utilizes solid state devices and a meter or other detection device is tied across two points of circuitry utilizing a principle similar to the well known electronic Wheatstone bridge employing electronic devices in each of four legs which may be resistors, capacitors, field effect transistors or other devices which react to non-electronic conditions such as thermocouples or ion chambers. The bridge is electronically balanced and the portion known as a detector side is set up to vary its electronic characteristics relative to the outside influence the circuit intends to detect. A change in the outside influence will unbalance the bridge causing current to flow thus indicating detection. The combination of very low voltage and extremely high resistors make the unit susceptible to varying temperature and humidity conditions which is minimized through the use of the physical inclusion of a portion of the bridge circuit inside an ion cell in the physical form of a plastic cylinder capped by two heavy plastic caps one on each end with suitable sealing means and gasketing at the points of closure. Electrical terminals are sealed in the plastic and suitable conduits are provided through the plastic for the entry of the gas. Resistors and other components are mounted on a small circuit board inside the cylindrical housing along with the flame detection component.

BACKGROUND OF THE INVENTION (1) Field of the invention

Gas detection devices, particularly portable and battery operated detection devices which employ fuel such as nitrogen and hydrogen and include a probe for picking up a gas sample. Gas detection devices that operate on a theory that a hydrogen-nitrogen flame of specific temperature generates a predictable flow of ions and that the introduction of additional hydrocarbon gas increases a flame temperature thus generating a measurable increase in the flow of ions and similar devices which pass the sample gas through a known flame and measure increases in ion flow.

(2) Description of the prior art

It is believed that a significant prior art device is one sold commercially by Southern Cross Corp., 3979 Buford Highway, Atlanta, Ga., 30329, sometime in 1969, similar to the instant one except for improvements in the area of detection to eliminate faulty readings apparently due to atmospheric conditions which adversely affected the prior art units. The prior art unit is a lightweight, portable unit suitable for battery operation from a low voltage battery power and capable of field operation at least an entire day without recharging either the fuel supply which is a gas mixture of hydrogen and nitrogen or the battery or recharging same. Previous prior art devices used a somewhat higher voltage requirement and while they were substantially solid state devices they required one or two small tubes in order to perform their leak detection objective. The Southern Cross Corp. prior art device employed basic electronic circuitry utilizing the well known electronic Wheatstone bridge principle; and Wheatstone bridge configuration with electronic devices, such as resistors, capacitors, field effect transistors or other similar devices which react to non-electronic conditions such as thermocouples or ion chambers, in each of the four legs. Low voltage is preferred for reducing battery cell weight.

A meter or other detection device tied across two points of the bridge shows no voltage potential or current flow from one side of the Wheatstone bridge to the other after power is applied to the bridge and it has been electronically balanced. Two legs of the bridge on one side of the meter are known as the reference or stable side of the bridge while the other two legs are known as the detector side of the bridge. The detector side of the bridge is arranged to vary electronic characteristics relative to the type of outside influence the circuit intends to detect so that a change in this outside influence on the bridge will unbalance the bridge causing current to flow through the meter thus indicating the desired detection of this unknown outside influence. In the case of the prior art device which was known as "Flame Pack" the ionization cell is the detection leg of the circuit and the objective is to measure a change in the ion flow from an anode to a cathode within the cell. Hydrogen fuel fed into the cell is oxidized with the air sample being drawn into the cell, and when the hydrocarbon element is drawn into the cell along with the air sample the hydrogen flame will ionize carbon molecules and conduct an electron flow between the cathode and anode points within the cell. The prior art "Flame Pack" worked but at times it was noticed that the detector device became very unstable and the detection needle would vary at random indicating current flows in the circuitry for no explainable reason. At times the stationary zero position of the meter would shift and come to rest in a new stationary position and the unit would become gradually less sensitive to the lower concentrations of hydrocarbons introduced into the sample system. After testing it became apparent that the unit instability seemed to result from environmental conditions and particularly temperature and humidity from the surrounding atmosphere and that apparently the combination of very low voltage and extremely high resistors used in the detector circuit which resulted in extremely low current flows within the circuit were being changed by the varying temperature and humidity conditions. Elements of the circuit board, wire insulation and electronic components which are ordinarily expected to be insulating materials because of their very high resistance seem to allow currents to flow and to become conductors rather than non-conductors. These current flows had the effect of allowing the active part of the reference and detection sides of the Wheatstone bridge which should have been electronically stable to actually vary with changing temperature and humidity conditions in the atmosphere. The physical arrangement of the present invention solves this problem within allowable limits by physical location including the placement of certain components inside the ion cell.

SUMMARY OF THE INVENTION

By physically moving a substantial portion of two legs of the bridge inside the ion cell which is a portion of the second leg, relatively constant conditions for both the reference and the detector side of the circuit were achieved and in addition the hydrogen flame's heat apparently reduces the effect of humidity of the circuit components contained within the cell. Physical revision of the affected

BRIEF DESCRIPTION OF THE DRAWINGS

FIG. 1 is a perspective view of a portion of the unit showing the cell.

FIG. 2 is a cross-sectional view taken substantially along lines 2—2 in FIG. 1.

FIG. 3 is a cross-sectional view taken substantially along lines 3—3 in FIG. 1.

FIG. 4 is a diagrammatic schematic of a typical Wheatstone bridge circuit.

FIG. 5 is a circuit diagram showing that portion of the unit circuit which is inside the cell.

DESCRIPTION OF THE PREFERRED EMBODIMENT

In a gas detection system of this sort there is a probe cone through which the sample is introduced, through a coupling and through a micron filter, through a flow meter to the analyzing cell by means of a pump. A hydrogen supply to the analyzing cell through a regulator and a capillary tube supplies the fuel for the analyzing cell to burn in the presence of the sample. As stated previously the changes, if any, due to the hydrocarbons determine what reading, if any, is made.

The unit is designated generally by reference numeral 10 and comprises a frame designated generally by reference numeral 12 in a leather case 14 and having a metal chassis 16 along one side and end chassis members 20, 22. With the exception of necessary operating switches, plugs and potentiometers, the entire electronic circuitry is carried on a removable circuit card 24 on the chassis plate 20. It employs printed circuitry and is 100 percent solid state with fuses, resistors, and ion cell with circuitry.

Conventional with this equipment in previous prior art embodiments the portable flame ionization gas detection unit includes a visible sample flow meter, an alarm sounding device, a coarse zero adjust, a fine zero adjust, sensitivity selector, instrument power switch, detector output meter, battery voltage meter, flame out meter, a sample inlet connection means and a fuel inlet connection means, a sample vent, remote output, battery support input and battery power pack compartment. The area of the unit to which the present invention addresses itself is that shown in FIGS. 2 and 3 and in the box-like housing supported on the chassis 16 in FIG. 1 and designated generally by reference numeral 30. Next to this is shown the pump arrangement designated by reference numeral 32 and which per se forms no part of the present claimed invention except that it pumps the sample to be tested through a flexible plastic conduit 34 connected by fitting 36 to the pump unit 32 and by a fitting 38 to the housing 30.

Housing 30 houses a portion of the detector circuit in a unit which is known as a detection unit designated generally by reference numeral 40 and comprising an analyzing cell designated generally by reference numeral 44 which is in the sealed unit 40 having housing 30 which comprises a pair of thick plastic blocks 46, 48 closing the opposite ends of a plastic cylinder 50 in which is contained various components to be identified. Plastic blocks 46, 48 have various holes drilled therein including holes 52 at each of the corners through which is inserted a long bolt 56 having nuts 58 which tighten the blocks tightly against the ends of the cylinder 50 and against a respective gasket 59 in each end. A plastic cap 60 with a hex-head closes a threaded opening 62 in the top block 46. The entire unit 40 is mounted in place to be detached and serviced as necessary by means of a hanger bracket designated generally by reference numeral 64 and having metal tabs 65 projecting therefrom in which the bolts 56 at opposite corners on one side are mounted by the nuts 58 as shown in FIG. 1.

Various holes are drilled in spaced locations on a circular arc through the bottom block 48 as shown in FIG. 2 and in which are mounted insulated terminals 66 comprising "Teflon" plastic sleeves 68 with electrical conductors inserted through holes 70 and held therein by a metal cap 72 threaded into the opening 70. Each terminal 66 has a terminal connection 74 to which a wire may be soldered.

Inside the unit 40 attached in openings 76 therein is a printed circuit board 80 having a printed circuit 82 thereon which in accordance with the art of printed circuits is an arrangement of metallic conductors leading from various elements and components on an insulated board 84 on which are mounted resistors 86, 88, and a field effect transistor 90 which are wired into the printed circuit. Wires 92, 94, 96, 98 lead through the printed circuit board to the various points at the junction of wires 92, 94, 96, 98 shown on the side of the board in FIG. 3.

Across the upper part of the printed circuit board 84 between points 100, 102 is the ignitor 107, a projecting member 106 detector probe is wired to contact 104.

An assembly 110 in the bottom block 48 and an opening 112 therein comprises a brass threaded pipe 114 in which is mounted a metal fitting 116 through which passes a tube 118 with a plastic or glass outlet terminating just beneath the ignitor 107. A porous screen 120 covers a recessed channel 122 in block 48 which leads through a small hole 124 through block 48 to a fitting 126 to which is attached a vinyl tubing 128 leading from the sample intake system.

Referring to the circuit diagrams in FIGS. 4 and 5, diagrammatically it is illustrated in FIG. 4 that the typical Wheatstone bridge circuit comprises leg 1, leg 2, leg 3, and leg 4, as described previously which is used in a detector circuit. In FIG. 5 it is seen that legs 1 and 4 are confined within the unit 30 tightly sealed inside of the cylinder 50 and sealed from communication except through the terminals and so forth as described previously.

In FIG. 5 shown in dotted lines the detection unit 30 is represented by the dotted line and it is seen that leg 1 and leg 4 are inside the unit 30. As mentioned previously this significantly reduces the trouble which was previously caused by having the elements exposed and subject to the environmental conditions particularly temperature and humidity.

While I have shown and described a particular embodiment of this invention together with a description of a preferred commercial form, this is for purpose of illustration and is not intended in any way to be a limitation or a confinement to any particular form since various alterations, changes, deviations eliminations, substitutions, additions, departures, omissions, and other revisions may be made in the embodiment shown without departing from the scope of this invention as defined by proper interpretation of the appended claims.

What is claimed is:

1. In a detector system for a flame ionization gas detection unit in which there is a balanced circuit comprising electrical components with at least four legs of the circuit:
   (a) a sealed cell having the flame detector and at least part of one first leg of the four legs sealed therein,
   (b) with at least part of another, second one of the said four legs of said circuit being inside said cell and there being circuitry connecting said first and second legs and sealed within said cell.

2. The device claimed in claim 1 where said balanced circuit is a Wheatstone bridge circuit comprising the four legs, the first one of said legs sealed within said sealed cell having sealed electrical connectors leading thereto through said sealed cell.

3. The device claimed in claim 1:
   a first resistor means in circuit within said sealed unit terminals sealed in said unit and there being electrical conductors passing through said unit to said terminals, a second resistor means in circuit inside said cell and being electrically connected by conductor means leading to terminal sealed in said unit, and there being other electrical components within said unit all being sealed therein and subject to the heat of said unit from the ignition thereof.

4. The device in claim 3:

a first resistor means in circuit within said sealed unit and being connected to terminals by electrical conductors passing through said unit to said terminals sealed therein, a second resistor means in circuit inside said cell and being electrically connected by conductor means leading to terminal sealed in said unit, and there being other electrical components within said unit all being sealed therein and subject to the heat of said unit from the ignition thereof.

5. The device in claim 1:

said unit comprising a sealed housing having a flame ignitor therein and conduit means for directing gas to said flame ignitor, sealed terminals in said unit electrically connected to said circuit components therein.

6. The device claimed in claim 5, wherein:

said cell is a tubular housing having gasket means on each end thereof, said housing being sealed at the top and the bottom by closure members which are bolted together across said cell through portions thereof.

7. The device in claim 6:

conduit means sealed in said unit from outside said unit for directing gas to said unit, other means sealed in said unit for directing sample gas to said unit, and a flame ignitor inside said cell and comprising a flame filament mounted near a gas outlet therein.

References Cited
UNITED STATES PATENTS 3,039,856    6/1962    McWilliam ____ 23—254 EF X MORRIS O. WOLK, Primary Examiner R. M. REESE, Assistant Examiner